(12) United States Patent
Hanna et al.

(10) Patent No.: US 11,334,136 B1
(45) Date of Patent: *May 17, 2022

(54) POWER LOSS SIREN (71) Applicant: Meta Platforms, Inc., Menlo Park, CA (US)

(72) Inventors: Sarah E. Hanna, San Jose, CA (US); Shlomo Priymak, San Francisco, CA (US); Aaron Jacob Miller, Sunnyvale, CA (US); Zhefu Jiang, Santa Clara, CA (US); Greg Epstein, Danville, CA (US); Manish Modi, Fremont, CA (US)

(73) Assignee: Meta Platforms, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/075,463

(22) Filed: Oct. 20, 2020

Related U.S. Application Data (63) Continuation of application No. 16/142,786, filed on Sep. 26, 2018, now Pat. No. 10,852,803.

(51) Int. Cl.
G06F 1/30 (2006.01)
G06F 1/3209 (2019.01)
G06F 11/34 (2006.01)
G06F 9/54 (2006.01)

(52) U.S. Cl.
CPC .............. G06F 1/30 (2013.01); G06F 1/3209 (2013.01); G06F 9/542 (2013.01); G06F 11/3476 (2013.01)

(58) Field of Classification Search
CPC .......... G06F 1/30; G06F 1/32–9; G06F 9/542; G06F 11/3476

USPC ......................................................... 713/300
See application file for complete search history.

(56) References Cited

U.S. PATENT DOCUMENTS

| | | | |
|---|---|---|---|
| 6,418,557 B1 | 7/2002 | Otani | |
| 7,366,933 B1 | 4/2008 | Aharonian | |
| 10,361,869 B2 | 7/2019 | Gorman | |
| 10,852,803 B2 * | 12/2020 | Hanna | G06F 9/542 |
| 2003/0222618 A1 * | 12/2003 | Kanouda | H02J 9/062 |
| | | | 320/116 |
| 2004/0212490 A1 * | 10/2004 | Fredericks | G08B 29/08 |
| | | | 340/506 |
| 2006/0010450 A1 | 1/2006 | Culter | |
| 2007/0210650 A1 | 9/2007 | Togashi | |
| 2009/0103436 A1 | 4/2009 | Heino | |
| 2010/0235003 A1 | 9/2010 | Maly | |
| 2011/0175730 A1 * | 7/2011 | Stevenson | G07C 9/33 |
| | | | 340/540 |
| 2011/0202701 A1 | 8/2011 | Maitra | |
| 2011/0289205 A1 | 11/2011 | Hansson | |
| 2012/0134085 A1 | 5/2012 | Gau | |
| 2012/0192007 A1 | 7/2012 | Weilnau, Jr. | |

(Continued)

Primary Examiner — Paul R. Myers
(74) Attorney, Agent, or Firm — Van Pelt, Yi & James LLP (57) ABSTRACT In an embodiment, a power management system includes a detection unit configured to detect a power interruption to a power supply. The system further includes a communication interface configured to, in response to the detected power interruption, provide a message regarding the detected power interruption. In response to the detected power interruption, a computer network switch provides notifications to a plurality of servers connected to the switch to allow the plurality of servers to prepare for a loss in power.

20 Claims, 7 Drawing Sheets (56) References Cited

U.S. PATENT DOCUMENTS

| | | |
|---|---|---|
| 2014/0141711 A1 | 5/2014 | Baker |
| 2014/0359356 A1 | 12/2014 | Aoki |
| 2015/0081893 A1 | 3/2015 | Chadwell |
| 2017/0192489 A1* | 7/2017 | Hance .................... G06F 1/263 |
| 2019/0215980 A1 | 7/2019 | Rhinehart |
| 2019/0250688 A1 | 8/2019 | Alaqeel |

* cited by examiner

POWER LOSS SIREN

CROSS REFERENCE TO OTHER APPLICATIONS

This application is a continuation of U.S. patent application Ser. No. 16/142,786 entitled POWER LOSS SIREN filed Sep. 26, 2018 which is incorporated herein by reference for all purposes

BACKGROUND OF THE INVENTION

A data center supports a variety of IT operations such as cloud computing and large-scale services such as application or data services. A data center houses racks of computer servers, which provide processing and data storage functionalities. The processing and data storage functionalities are implemented by processing, telecommunication, and networking equipment such as processors, switches, and routers in the server racks.

Service disruptions such as power failures may result in consequences for rack-mounted devices. For example, there may be disruptions to services due to a power failure. Conventionally, a data center is connected to an AC utility grid. A server rack in a typical data center implemented according to the Open Compute Project converts the AC power to DC power via power supply modules for use by rack-mounted devices.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing a notification associated with a power loss is disclosed. A power loss siren may include a notification of imminent power loss. The power loss siren is implemented by a power management system that notifies data center components before power to the components is suspended. Conventionally, server components do not receive warnings before a power loss, which is disruptive to services if the components are unprepared. The disclosed power loss siren mitigates some of the risk of downtime due to power disturbances by allowing data center components to prepare for the power loss. As more fully described below, a server rack includes a detection unit (such as a power supply unit), a computer network switch to manage components within a server rack and communications between racks, power supplies to service rack components, and servers. In various embodiments, a power management system includes a detection unit configured to detect a power interruption to a power supply. For example, if there is an outage in a utility grid, power to the power supply of the server rack may be interrupted. The power management system also includes a communication interface configured to, in response to the detected power interruption, provide a message (e.g., to a computer network switch) regarding the detected power interruption. In response to the detected power interruption, the network switch provides notifications to servers connected to the computer network switch to allow the servers to prepare for a loss in power.

Figure 1:
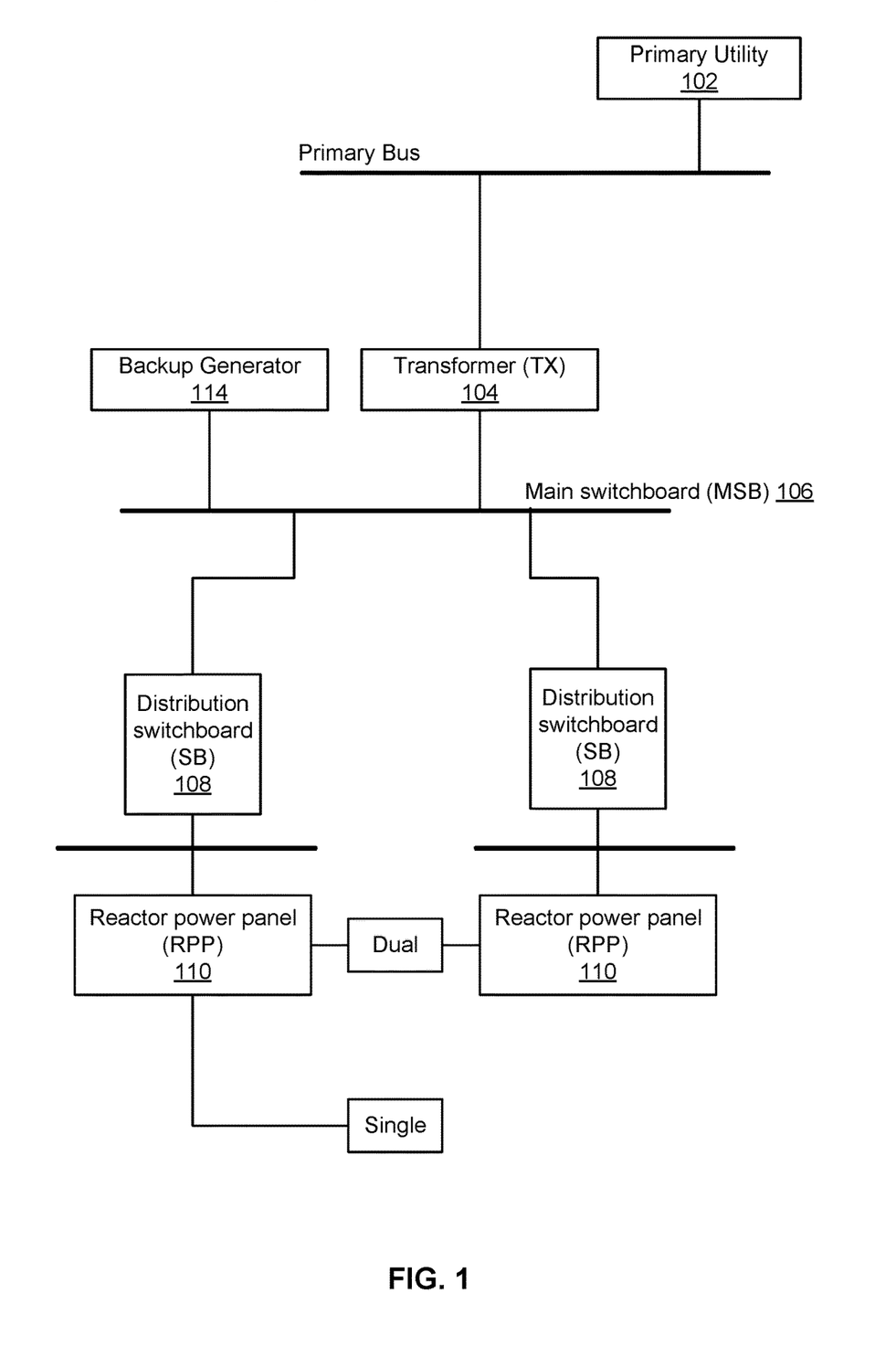
FIG. 1 illustrates an example of a power distribution flow from a power generator to a server rack.

FIG. 1 illustrates an example of a power distribution flow from a power generator to a server rack. Electricity is generated from a power station (e.g., primary utility 102) and delivered to a consumer (in this example, a data center) according to this example distribution flow. For example, an electric utility may generate power in a variety of ways (hydroelectricity, wind turbines, solar panels, etc.). The electrical energy is then transmitted from the power plant to a substation and then to consumers. The transmission involves stepping up the power and stepping down the power at various stages. In this example flow, the focus is on the later stages of electric power delivery in which electricity is delivered from a transmission system to consumers. Here, transformer 104 lowers the voltage to a voltage suitable for main switchboard 106 of a building. For example, a local electrical supply supplies a main switchboard in the building.

Main switchboard 106 is a device that directs electricity from a source of supply to smaller regions of usage. The main switchboard provides power feeds to other distribution/sub-distribution boards in the building. For example, main switchboard 106 services an entire building by directing power supplied by transformer 104 to distribution switchboard 108. Each distribution switchboard 108 services a smaller region within the building such as a floor of the building. A main distribution board may be located on a floor, while a sub-distribution board provides a feed into a server room. Individual power feeds can be provided for rack power distribution units. In some embodiments, each main switchboard has a standby generator that provides power in the event of utility outage.

Distribution switchboard 108 delivers power to a reactor power panel 110. Reactor power panel 110 can be a custom device that delivers three-phase power to the server cabinet level. For example, the reactor power panel can improve efficiency by reducing short circuit current, correct leading power factor, reduce current harmonic distortion, and the like. Although two RPPs are shown here (in a dual and a single configuration), addition RPPs may be provided. For example, in some systems each of the RPPs represent a group of 12 RPPs. In some embodiments, power is conducted via a busway (also known as bus bar or bus duct) to a tap box. A tap box facilitates power restoration to a building or portion of building if there is an outage. For example, it can be connected to an automatic or manual transfer switch in the power distribution network, working in cooperation with the switch and a backup generator to restore power if there is an outage. A tap box can be electrically coupled to rack power distribution unit (PDU), and is configured to supply power to the rack PDU. The rack PDU is a distribution unit corresponding to a server rack such as the one shown in FIG. 4. Rack PDU delivers power to one or more power shelves in the server rack.

A power shelf contains power supply units that use the load-balancing benefits of the three-phase input from the power grid to deliver power to components in a server rack. The power shelf can rectify each phase (e.g., a hot wire and neutral wire) in parallel to provide DC voltage through a single DC bus pair (e.g., a positive and negative DC low voltage terminations). The DC bus pair can provide power to rack-mounted equipment in a "power zone." In some embodiments, a power shelf includes three pairs of power supply units (PSUs) and backup battery units (BBUs). Each pair is referred to as a "power module." Each PSU in each pair can receive one of the three AC phases from the AC power source (here, via rack PDU). This enables the power supply system to draw from the three-phase power in a way that the power never or rarely falls to zero, meaning that the load is the same at any instant, ensuring a substantially even balance of the input AC phases. The three power modules are coupled in parallel to a DC bus to provide power to rack-mounted equipment within the server rack. Here, for example, power is delivered by the power shelf to a power supply unit, which in turn delivers power to a server and server components such as a CPU. An example of a power shelf is further described with respect to FIG. 4.

The power distribution can have a variety of example voltages. These voltages are merely exemplary and not intended to be limiting. For example, main switchboard 106 converts 2.5 MW to 1.25 MW for distribution switchboard 108. Distribution switchboard 108 then converts the voltage to around 155-189 kW for the reactor power panel 110. By the time the power reaches the tap box, the voltage is lowered to 12.6 kW. In this example, a power shelf takes voltage at 6.6 kW, and each power supply unit in the power shelf supplies 3.2 kW of power. A typical two socket compute server consumes 300-400 W of power, and each CPU consumes 200 W or less of power, depending on generation. These numbers can change based on hardware generation and configuration. Storage devices may have different power profiles.

Redundancies built into the power distribution flow protects against power outages that impact server uptime. In conventional systems, one area that does not have much built-in redundancy is downstream of the distribution switchboard 108. Outages downstream of the distribution switchboard directly impacts server availability and uptime. The power management system disclosed here reduces the impact of power outages by broadcasting an AC power outage notification within a server rack. This increases resiliency to unplanned power outages in data centers, for example preventing service interruptions. The performance of the server network is thus improved.

Figure 2:
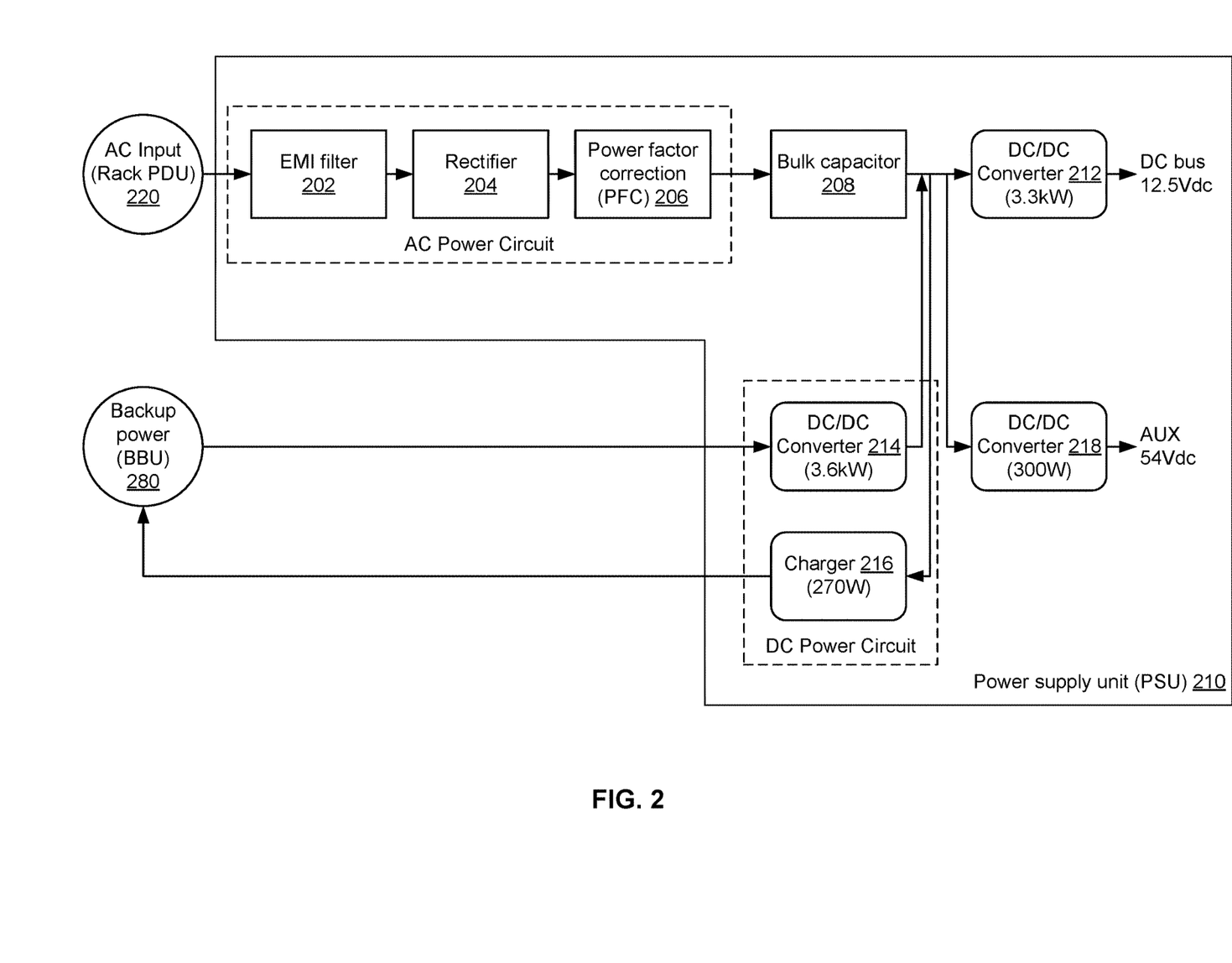
FIG. 2 is a block diagram of a system for distributing power within a server rack according to an embodiment.

The following figure shows an example of how power is distributed within a server rack.

FIG. 2 is a block diagram of a system for distributing power within a server rack according to an embodiment. The system includes power supply unit (PSU) 210 and battery back-up unit (BBU) 280. PSU 210 is usually powered by AC input 220 from a rack power distribution unit (e.g., rack PDU 116 of FIG. 1). In case the AC input is unable to power the PSU such as during a power outage, BBU 280 provides backup power for a relatively brief time when the AC utility grid is unable to deliver power. In other words, BBUs can extend power for some time before rack-mounted devices perceive a power outage. However, BBUs can provide back-up power for only a limited time, and data may be lost for example if a server is in the middle of an operation when power is lost. The power loss siren techniques described here proactively respond to power disruptions by warning server hosts of imminent power loss.

In this example, PSU 210 supplies power at two different DC voltages: DC bus, (here, 12.5V) and auxiliary power (here, 54V). The two different DC voltages power components that use different voltages. The DC bus is serviced by the PSU as follows. AC input 220 is received from a rack PDU. The signal can be processed by an AC power circuit including EMI filter 202, rectifier 204, and power factor corrector 206. These components are configured to remove EMI noise/interference, rectify an AC current to DC voltage, and provide power correction to the rectified signal, and are further described with respect to FIG. 3. The conditioned signal is output to bulk capacitor 208. The bulk capacitor is configured to provide smooth voltage transitions during AC outages and AC restores, and holds electric charge at the bulk voltage terminal such that a substantially constant DC voltage is maintained. The power is then converted by each of DC/DC converter 212 and DC/DC converter 218 to a desired voltage to power the components of a server rack in which the PSU is provided.

When rack PDU is operating normally, e.g., providing sufficient power to PSU 210, BBU 280 is typically not powering the PSU. Instead, the BBU is charged by charger 216 so that, in the case of a power outage, the BBU can be used to power the PSU. When there is a power outage, BBU 280 services PSU 210 by providing DC input to DC/DC converter 214. The converted signal may be further stepped up or down by DC/DC converter 212 or DC/DC converter 218 to a desired voltage.

The voltages shown for the DC/DC converters 212, 214, and 218, charger 216, and output voltages corresponding to the DC bus and AUX are merely exemplary and not intended to be limiting.

Figure 3:
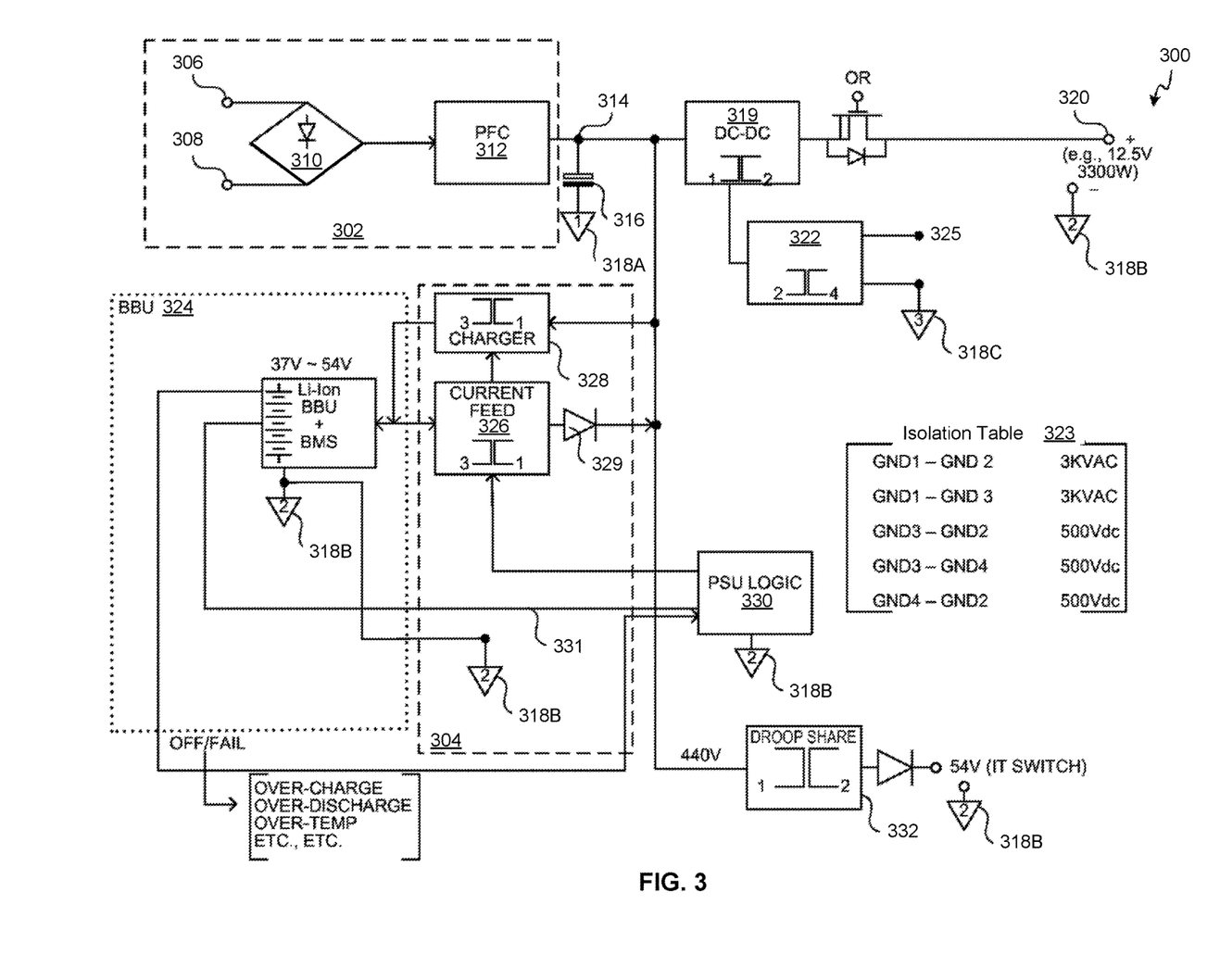
FIG. 3 is a circuit diagram of a power supply circuit of a power supply unit in a power shelf according to an embodiment.

The following figure is an example of circuit implementing the power distribution flow described with respect to FIG. 2.

FIG. 3 is a circuit diagram of a power supply circuit of a power supply unit in a power shelf according to an embodiment. For example, a power system can include multiple power shelves, e.g., power shelf 404A and 404B of FIG. 4, within a server rack. Each power shelf includes at least two PSUs (in a single phase solution) or includes at least three PSUs (in a three-phase solution). In various embodiments, each PSU includes the power supply circuit 300 disclosed herein.

The power supply circuit 300 includes an AC power circuit 302 and a DC power circuit 304. The AC power circuit 302 receives an AC phase 306 of AC power and a neutral line 308 from a power grid. For example, the AC phase 306 can provide 277V AC power. The AC phase 306 can be one of three AC phases provided through the power grid. The AC phase 306 and the neutral line 308 can feed into a rectifier circuit 310 to rectify the AC power into or approximately into DC voltage. The rectifier circuit 310 may further include an inrush control protection circuit (not shown) to prevent electromagnetic interferences and electric discharges of the AC phase 306.

The rectifier circuit 310 can be coupled to a PFC module 312. The PFC module 312 provides power correction to the rectified output of the rectifier circuit 310. For example, the PFC module 312 can remove effects of leakage inductance or reactance that limits the output current of the rectifier circuit 310 and/or adjust the power factor and the iTHD (current total harmonic distortion). The PFC module 312 can output a DC voltage (hereinafter the "bulk voltage") to a bulk voltage terminal 314. That is, the AC power circuit 302 receives an electrical input at the AC phase 306 and provides a DC electrical output at the bulk voltage terminal 314.

A bulk capacitor 316 can be coupled between the bulk voltage terminal 314 and a first negative return terminal 318A. The bulk capacitor 316 can hold electric charge at the bulk voltage terminal 314 such that a substantially constant DC voltage (e.g., around 440 volts) can be maintained at the bulk voltage terminal 314 even without the PFC module 312 being operational. The bulk capacitor 316 can provide smooth voltage transitions during AC outages and AC restores.

The bulk voltage terminal 314 is coupled to a DC-DC converter 319 as the input to the DC-DC converter. For example, the bulk voltage terminal 314 can be connected via a high resolution current share bus. The high resolution current share bus can be used to provide high output current share accuracy. In some embodiments, the converters drawing current from the bulk voltage terminal 314 share the output current very precisely. In this way, the respective input AC RMS currents would be well balanced and so, the three three-phase input AC currents would have similar values and therefore be balanced. The precise current sharing enables the power supply circuit 300 to maintain the same load over the three phases of a three-phase AC input from the power grid.

The DC-DC converter 319 can down-step the DC voltage to a lower voltage. The lower voltage is provided throughout a power zone associated with the PSU that the power supply circuit 300 is part of. The lower voltage is provided to the power zone via a DC bus 320. The DC bus 320, for example, provides a 12V or a 12.5V DC voltage relative to a second negative return terminal 318B. The DC bus 320 can create a common DC voltage used to power the system in a server rack supported by the power supply circuit 300. For example, the DC bus 320 can also connect in parallel to other PSU and BBU pairs. This parallel connection is advantageous since if one of the parallel connections suddenly fails, the remaining two would not be affected by the failure and would be able to carry on the full power required by the power system.

In various embodiments, the power supply circuit 300 represents one of three power modules in a power shelf, where each power module receives a single phase input. The DC bus 320 is connected in parallel to other output voltages other than the output of the DC-DC converter 319. This connection enables a redundant power shelf solution. A power shelf with these parallel PSU bus connections generate enough power to sustain the system load. In other embodiments, the DC bus 320 may instead by connected to one power module with a three-phase AC input with a second power module connected in parallel for redundancy. These alternative embodiments would cost more because a (1+1) redundant scheme and a three-phase input power supply normally costs more than a single-phase input power supply. Further, the three-phase input is normally less efficient than single phase AC inputs.

The DC-DC converter 319 can be coupled to an isolated transceiver 322 that guards against large negative return-to-negative return differentials. The isolated transceiver 322 can be coupled to a third negative return terminal 318C. The negative return terminals are isolated from each other to avoid return loop currents and to limit differential and common mode noise. The negative return isolation also avoids load return currents that may be flowing through high power current return paths (e.g., taking the wrong route through signal return paths when the negative returns are not isolated). The power supply system can share the same eventual negative return termination at the power shelf. If the isolated transceiver 322's negative return is isolated at the source, return loop currents would be impossible. An isolation table 323 lists the voltage isolation levels of the (isolated) converters built-in inside the power supply circuit 300. These isolations levels can be sized by those who design the isolated power converters.

The isolated transceiver 322 may output a digital line 325 for external communication (e.g., health status reporting) with devices outside of the power shelf or for internal communication between instances of the power supply circuit 300 in the same power shelf (e.g., a power shelf with three power supply circuit 300 each corresponding to a PSU and BBU pair).

The DC power circuit 304 is coupled to a battery backup unit (BBU) 324 (shown with dotted lines to indicate that the BBU 324 is not part of the power supply circuit 300), and includes a current feed converter 326 and a battery charger 328. For example, the DC power circuit 304 may include an electrical interface to couple with the BBU 324. The BBU 324 can include a set of batteries connected in series. For example, the set of batteries can provide up to 37V to 54V of DC differential relative to the second negative return terminal 318B. The BBU 324 can detachably connect to the power supply circuit 300 of the PSU. The DC voltage output of the BBU 324 is connected to the current feed converter 326. The current feed converter 326 steps up the DC voltage of the BBU 324 to the constant DC voltage at the bulk voltage terminal 314. In some embodiments, an asymmetric conductance component 329 (e.g., a diode) is coupled in between the current feed converter 326 and the bulk voltage terminal 314. The asymmetric conductance component 329 ensures that current flows only in the direction from the current feed converter 326 to the bulk voltage terminal 314 and not vice versa.

The BBU 324 supports powering of the DC bus 320 in case of AC power grid outage. The current feed converter 326 can be configured to discharge the BBU 324 for a set amount of time during an outage (e.g., a 90 seconds timeout), where the BBU 324 shuts down when the backup sequence reaches the set amount of time. In some embodiments, the BBU 324's voltage is only connected within the power supply circuit 300 representing its corresponding PSU, forming a pair. Each instance of the BBU 324 is independent against remaining BBUs installed in the power shelf. For instance, the BBU 324 extends the hold-up time of its corresponding PSU from a usual 20 milli-seconds (e.g., by a capacitor) to a full 90 seconds or more. The 20 milli-seconds may correspond to a full cycle of the input AC sinusoidal voltage at 50 HZ. A power loss siren can be raised before the duration by which the BBU extends the hold-up time ends. The power loss siren prepares components powered by the power shelf for a power outage.

The battery charger 328 provides suitable voltage to charge the BBU 324 when the AC power circuit 302 is operational (e.g., the AC phase 306 is providing power and the PFC is functioning). The battery charger 328, for example, can be an isolated step-down converter connected between the bulk voltage terminal 314 and the BBU 324.

The power supply circuit 300 can include a PSU logic module 330. The PSU logic module 330 can be an application specific integrated circuit (ASIC), a field programmable gate array (FPGA), a controller, a processor, or other logical units capable of computation. The PSU logic module 330 is configured to control the current passing through the current feed converter 326. The PSU logic module 330 can be coupled to the BBU 324 (e.g., through the electrical interface of the DC power circuit 304 or through another electrical interface) to monitor power condition of the BBU 324 and to react on signals coming from the BBU 324. For example, the BBU logic can determine an internal failure (and other electrical and environmental conditions) and report it to the PSU logic module 330 of same pair. For example, the BBU logic can communicate with the PSU logic module 330 through a digital bus 331. The digital bus 331 may be used for communication between the BBU and the PSU logic module 330 as well as for reporting state of health information from the BBU to the PSU logic module 330. The PSU logic module 330 can also determine when the BBU 324 is over-charged, over-discharged, over-heated, and etc. Based on the power condition of the BBU 324, the PSU logic module 330 can assess in real-time the health of the pair (PSU and BBU), and stop either charge or discharge as needed, under several protection modes. For example, when performing a battery test, the PSU logic module 330 can discharge the BBU 324 at constant current, constant power, or at real-time system power. The PSU logic module 330 can also stop a BBU test at anytime as needed or when considered necessary per diagnostic by the PSU logic module 330 or the BBU logic. Similarly, the PSU logic module 330 can discharge the BBU 324 for backup power discharge in case of AC power grid outage.

The power supply circuit 300 can further include a droop share converter 332. The droop share converter 332 can be a low-power isolated droop share converter. The droop share converter 332 is coupled in parallel to the respective DC-DC converters (e.g., the DC-DC converter 319) in the remaining power modules in the power shelf. The droop share converter 332 is a DC to DC converter that steps down the bulk voltage to a DC voltage different from the DC voltage at the DC bus 320 (e.g., also known as "AUX voltage", and can be typically 54V DC). Droop share converters enable load sharing in an array of converters. For example, the droop share converter 332 can artificially increase the output impedance to force the currents through the DC-DC converter 319 and the droop share converter 332 to be equal, without actually dissipating any power. This may be accomplished, for example, by an error signal which is interjected into the control loop of the droop share converter 332.

In various embodiments, the voltage at the DC bus 320 is protected from AC power grid outage, because the DC-DC converter 319 is fed from the BULK voltage terminal 314 within the same PSU. The AUX voltage can be conveniently used to power rack switching gears, and any other auxiliary rack gears that may need continuous reliable power. Switching gears can normally be powered by one power supply with an additional power supply for redundancy (e.g., a (1+1) redundant power setup). Hence, normally switching gears can use two power supplies in parallel, while one power supply is enough to sustain the full load. At the rack level, the two power supplies can be fed by the AUX voltage coming from a first power shelf installed in the rack, and the AUX voltage coming from a second power shelf in the rack. This would be a full redundant layout, where there are two independent AUX sources, each one with three pairs of PSU and BBU (e.g., a (2+1) redundant setup as explained above), and two independent power supplies installed in the switching gear.

Each of the modules/circuits/components may operate individually and independently of other modules, circuits, or components. Some or all of the circuits, components, and/or modules may be combined as one component or module. A single module/circuit/component may be divided into sub-modules, each sub-module performing a separate electrical transformation or transformations of the original single module/circuit/component.

Figure 4:
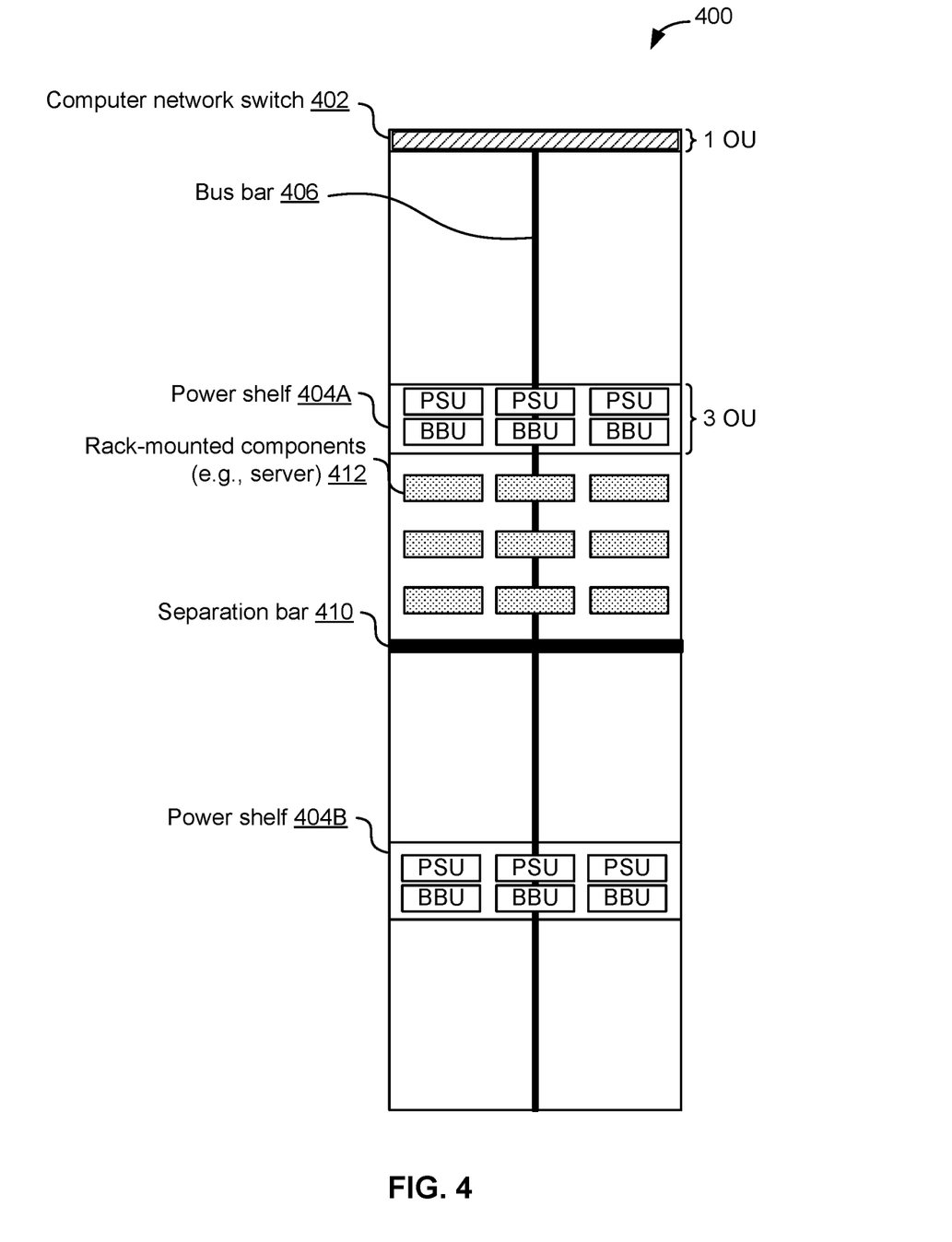
FIG. 4 is a block diagram illustrating an embodiment of a server rack in which a power management system is provided.

The following figure is an example of a server rack with components corresponding to the intra-rack distribution flow of FIGS. 2 and 3.

FIG. 4 is a block diagram illustrating an embodiment of a server rack in which a power management system is provided. This example shows a single rack column. In various embodiments, rack columns may be grouped into several (e.g., three rack columns), and the group of rack columns may share one or more components.

Rack column 400 includes a computer network switch 402, two power shelves (e.g., a power shelf 404A and a power shelf 404B, collectively called the "power shelves 404"), and a bus bar 406. In some embodiments, rack column 400 includes a separation bar 410 and rack-mounted components such as servers 412. The rack-mounted components provide server functionalities such as servicing requests and supporting applications and services. The separation bar isolates regions within the rack column. Here, a top half of the rack column is separated from a bottom half of the rack column by the separation bar. The number and placement of rack-mounted components 412 is merely exemplary and not intended to be limiting. In some embodiments, power shelf 404A powers rack-mounted components 412 and power shelf 404B powers a different set of rack-mounted components, which are not shown here for simplicity.

Computer network switch 402 (also known as a top-of-rack "TOR" switch) is configured to provide control of one or more rack columns. Computer network switch 402 can be configured to manage components within a respective rack column. For example, computer network switch can implement the power management processes described here by notifying servers connected to the computer network switch of an imminent power loss. This allows the servers to prepare for a loss in power. Computer network switch 402 is configured to interconnect rack columns. For example, the computer network switch facilitates communications between rack columns. One example of a TOR switch is a Facebook® Wedge switch, which is an OS-agnostic switch that includes a server module. Components such as the server module in the Wedge switch can be easily modified and replaced according to networking needs and when new technology becomes available. Although shown at the top of the rack column, computer network switch 402 may be disposed elsewhere (middle, bottom, etc.) in the rack column in other embodiments.

In some embodiments, computer network switch 402 includes a baseboard management controller (BMC). A BMC is a specialized controller embedded in servers. In some embodiments, the BMC is implemented by a system-on-chip (SoC) with its own CPU, memory, storage, and IO. A BMC can be coupled to sensors to read environmental conditions, and can be coupled to fans to control temperature. The BMC is configured to provide other system management functions such as remote power control, serial over LAN, monitoring and error logging of the server host CPU and memory, and the like. An example of a BMC is OpenBMC.

Rack column 400 includes two power shelves 404. Each of the power shelves includes three PSU and BBU pairs. A PSU is configured to communicate with and manage one or more corresponding BBUs. For example, the PSU can instruct the BBU to charge or discharge. The PSU can send messages to computer network switch 402 regarding the PSU itself or the BBU associated with the PSU. Each PSU may include a power supply circuit (e.g., the power supply circuit 300 of FIG. 3). Each of the power shelves 404 establishes its own power zone (e.g., the power shelf 404A powers a first power zone above separation bar 410 and the power shelf 404B powers a second power zone below the separation bar 410). For example, the power shelf 404A can provide power to the first power zone via DC bus bar 406. One or more DC bus bars can be coupled in parallel to the power supply circuits of the PSUs. The DC bus bars 406 can bundle two wires (positive and negative terminations, with negative chassis pre-mating bus bar) providing a DC differential voltage (e.g., 12.5V). The two power zones are electrically isolated from each other. In some embodiments, there may be a provision to connect the power zones in the rear of the rack making up one power zone. In this case, only one power shelf would be used per rack column for a low-power implementation.

In the embodiment of the rack column 400 shown in FIG. 4, the power shelves 404 are positioned in the middle of their respective power zones. One set of the DC bus bars 406 extends above the power shelves 404 and another set extends below the power shelves. This positioning advantageously reduces distribution conduction losses from the DC bus bars 406 by minimizing the length of each set of the DC bus bars 406 and by splitting the current in half.

The rack column 400 may be implemented in accordance with the Open Compute Project standard (Open Rack V2) having a rack height of around 87 inches or 42 open rack units. In the Open Compute Project standard, an open rack unit or "OU" is a unit for the height of a chassis mounted in the rack. 1 OU is 48 mm high. For example, each of the power shelves 404 can occupy 3 OU of space.

Power input equipment, e.g., a top power rail (e.g., a rack power distribution unit corresponding to rack PDU 116 of FIG. 1) can take up 1 OU to 3 OU of space in the rack column 400. In the example shown here, computer network switch 402 takes up 1 OU of space. For example, the power zone corresponding to power shelf 404A provides 18 OUs of space, including 8 OUs of space above the power shelf 404A, 8 OU of space below the power shelf 404A, and 2 OU of space taken up by the power shelf 404A. The two power zones can be separated by a separation bar 410 that takes up 0.5 OU of space. The separation bar can serve as a stabilizer and a calibrator. For example, the separation bar can be 339 mm long. DC bus bar 406 can be coupled to the power input equipment and the power shelf, to deliver power from the rack PDU to the power shelf.

Three-phase AC power is delivered to power shelves 404, and then distributed to the three PDUs within that shelf. In some embodiments, there is a one-to-one relationship between the PSU and the BBU located below it. The PSU is only responsible for charging the BBU below it. When there is an AC outage, the PSU will use the power from the BBU and convert it to the DC voltage, e.g., 12.5V, used by the components serviced by the power shelf.

Figure 5:
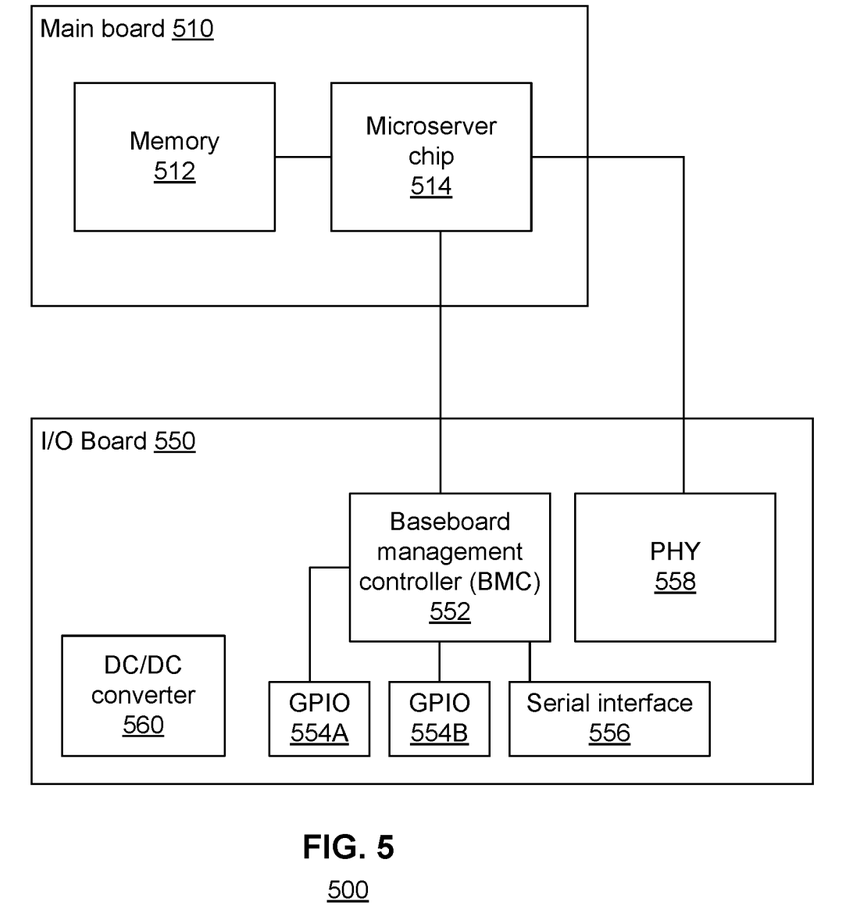
FIG. 5 is a block diagram illustrating an embodiment of a rack monitor for providing a power loss siren.

In some embodiments, computer network switch 402 is configured to monitor the health of power components within one or more rack columns. For example, the computer network switch may include a rack monitor for monitoring. The monitoring also reveals whether there is an AC outage that impacts a power shelf. The topology of the rack column and power delivery system can be used for a notification system (sometimes called a power loss siren) to allow services to automate a quick response to an outage. An example of a rack monitor is shown in FIG. 5. In some embodiments, a rack monitor may be mounted on top of the computer network switch 402. In some embodiments, the rack monitor may be implemented by a microcontroller provided inside computer network switch 402 to help implement the power loss siren technique described here.

In operation, a PSU senses an AC outage. In some embodiments, a PSU includes a sensor that detects an AC outage, for example when there is no current. In some embodiments, a computer network switch 402 monitors the health of power components within one or more rack columns by receiving sensor readings or other notifications from the PSU. The PSU signals to the BBU that an AC outage has occurred, causing the BBU to discharge and provide power to the PSU. For example, according to the Open Compute Project standard, BBUs are configured to provide 90 seconds of back-up power. According to the power management techniques described here, a PSU detects an outage, sends a message regarding an AC network outage. In some embodiments, the message is received by a computer network switch such as a baseboard management controller (BMC) in the switch. The computer network switch then broadcasts the outage information to associated rack-mounted components such as servers, allowing the servers to prepare for power loss. The rack-mounted components have time to wind down processes before they perceive a power loss, e.g., before the BBUs cease providing power to the PSUs.

Conventionally, servers are not notified of an imminent power loss, and thus are impacted if they are unable to wind down processes during the time that back-up power is provided by the BBUs to the servers (e.g., 90 seconds). According to an embodiment of the present disclosure, the servers are notified about an imminent loss of power before or during the time that BBUs (rather than the AC input) are providing power to the PSUs. This allows servers to proactively respond and prepare for power loss, e.g., store data, and reduces the impact to the services.

The following figure is an example of a rack monitor that is configured to monitor for a power outage and notify a computer network switch of an imminent power loss.

FIG. 5 is a block diagram illustrating an embodiment of a rack monitor for providing a power loss siren. The rack monitor may be provided inside a computer network switch such as switch 402. The rack monitor may be a stand-alone device with its own chassis occupying 1 OU or less of space in a rack column.

Figure 7A:
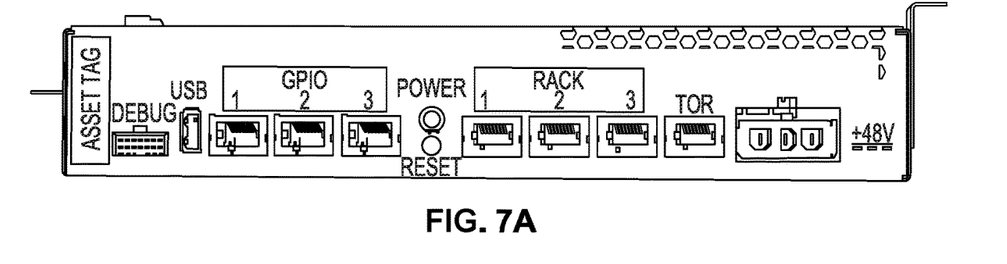
FIG. 7A is a front view of an example of a physical rack monitor.
Figure 7B:
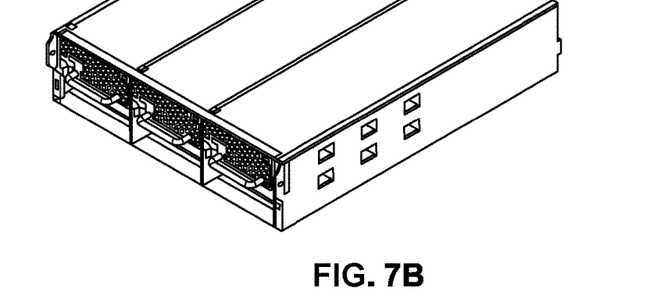
FIG. 7B is a perspective view of an example of a physical rack monitor.

The rack monitor 500 includes a main board 510 and an input-output (I/O) board 550. In various embodiments, the rack monitor is configured to provide power monitoring functions such as monitoring power loss to one or more PSUs. For example, the PSUs may have sensors detecting flow of current and report readings or abnormalities to the rack monitor. In some embodiments, the rack monitor is configured to monitor 18 or more power supplies, e.g., via serial interface 556 such as RS485 communication from the power shelves. One rack monitor may be used for monitoring several rack columns. PSUs report their status to the rack monitor via software running on the monitor. The rack monitor acts as a Master, and all connected devices (e.g., PSUs) act as Slaves. An example of a physical rack monitor unit is shown in FIGS. 7A and 7B.

Main board 510 includes memory 512 and microserver chip 514. The main board can be implemented by a microserver card. Main board 510 receives status signals from other devices. For example, signals received by the GPIO ports 554A and 554B of the I/O board 550 are analyzed to determine how to respond to various fail signals. Main board 510 is configured to implement the processes described here, e.g., the one shown in FIG. 6. For example, memory 512 stores instructions for microserver chip 514 to execute the processes described here. In some embodiments, memory 512 may store log data and forward the log data to a remote database in batches. The rack monitor reads the state of health of IT equipment for which the monitor is responsible and reports discovered failures. For example, when a power outage occurs, the main board determines a wait period, and, at the end of the wait period, notifies a computer network switch or hosts of a rack of an imminent power loss.

I/O board 550 includes a baseboard management controller (BMC) 552, a physical chip 558, and DC to DC converter 560. The I/O board is configured to provide ports, serial communication, and out of band management functionalities to the main board 510. The I/O board is communicatively coupled to the main board 510 via the BMC 552. For example, the I/O board is coupled to the main board via an Ethernet system managed by physical layer chip 558, which Ethernet system can be connected to a top-of-rack switch. GPIO ports (here, a first GPIO port is 554A and a second GPIO port is 554B, and collectively they are called GPIO ports 554) monitor fail signals from other IT/power equipment. For example, power outage messages can be received via the GPIO ports 554. Each IT/power equipment device may have a dedicated GPIO for reporting its failures. For example, when a power shelf is operational, two pins are open, and they are shorted when a failure occurs.

The rack monitor may be powered by an auxiliary power such as the one shown in FIG. 2. The DC/DC converter 560 steps the voltage down to appropriate voltages for the rack monitor components.

Figure 6:
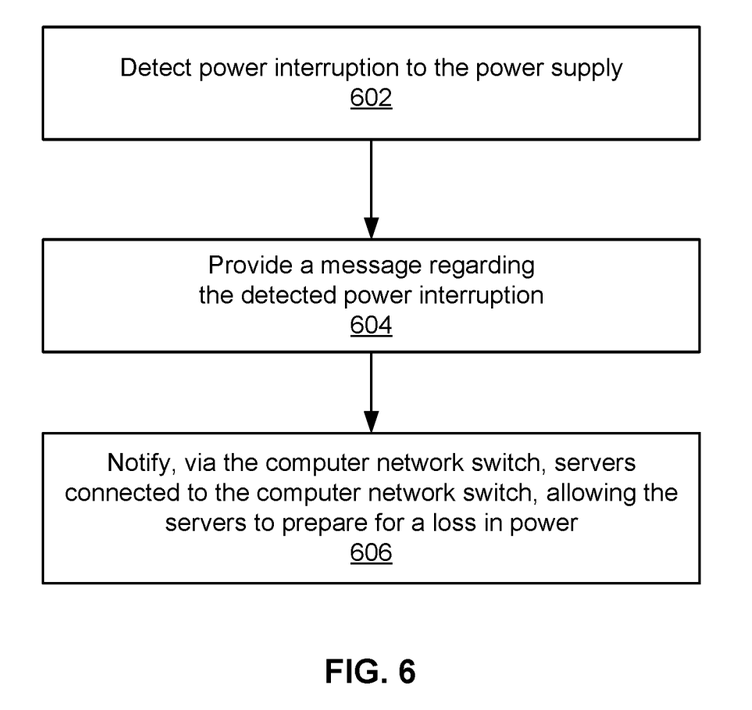
FIG. 6 is a flow chart illustrating an embodiment of a process for providing a power loss siren.

The following figure is an example of a process that can be carried out by the rack monitor to provide a power loss siren.

FIG. 6 is a flow chart illustrating an embodiment of a process for providing a power loss siren. A power loss siren is a message distributed to rack components such as servers to warn the components that they are about to experience a power loss.

A power interruption to the power supply is detected (602). For example, a sensor on a PSU detects that there is a power outage. The sensor may measure current to determine whether power is being delivered to the PSU or monitor other aspects of performance and power health. In some embodiments, a computer network switch (e.g., a rack monitor in a network switch) coordinates or monitors PSUs.

A message is provided regarding the detected power interruption (604). The message may be provided to a component such as a computer network switch. In some embodiments, a network switch includes a baseboard management controller (BMC) configured to receive the message. In some embodiments, the general-purpose input/output (GPIO) signal indicating a power loss condition. For example, the message created as a result of the GPIO notification includes an outage state, a duration, or a port. The outage state indicates a condition, for example that there is a power outage, as indicated by a flag, number, or the like.

In some embodiments, the condition indicates that the power loss is a redundancy loss. A redundancy loss refers to loss of power to a redundant PSU. Referring to FIG. 4, one of the three pairs of PSUs and BBUs in power shelf 404A is redundant, meaning that voltage and power supplied through the DC bus is sufficient to power the rack-mounted equipment even when one of the multiple pairs is inoperative. The redundant inoperative pair may indicate a power loss. In some embodiments, in this situation a notification is not sent because interested services will be able to perform as usual with the remaining two PSU/BBU pairs.

The duration indicates how much time has elapsed since the beginning of the AC outage or a countdown to when BBU power will run out. For example, if the sending of the message is delayed for 45 seconds and a BBU provides 90 seconds of backup power, then the countdown will indicate 45 more seconds until power is lost. The port indicates where an outage signal is received from or where an outage is reported from.

The message can be output, stored, or used in a variety of ways. For example, in response to the message, a computer network switch notifies servers connected to the computer network switch, allowing the servers to prepare for a loss of power (606). In some embodiments, the computer network switch notifies all hosts within a rack of the imminent power loss. A siren client library on the hosts delivers notifications to interested services.

The message, which indicates an imminent power loss event can be logged and tracked in a remote database. This message is sometimes called a "siren" or "notification." For example a data center wide power management system that manages the power hierarchy can log the message and use it for analytics. Facebook® Dynamo is an example of a data center wide power management system. One component of Dynamo is a Dynamo agent that is deployed on each server in the data center. The Dynamo agent reads power, executes power capping/uncapping, commands, and communicates with Dynamo controllers. In some embodiments, Dynamo agents communicate with each other via Dynamo controllers. A Dynamo controller runs on a group of dedicated servers, monitors data from the Dynamo agents under their control, and helps to protect data center power devices. A hierarchy of Dynamo controllers mirrors the topology of the data center's power hierarchy to monitor and control downstream servers for that device.

In some embodiments, the message is sent to the computer network switch at the same time that another message instructing the BBUs to discharge is sent to the BBUs. In some embodiments, the message is sent to the computer network switch after a waiting period. For example, instead of sending the outage message immediately upon detection of an AC outage, a predefined waiting period elapses before sending the message. The waiting period can be selected to reduce false positives. For example, for a BBU that provides backup power for 90 seconds, 45 seconds can be the waiting period. That is, servers are notified around 45 seconds after a loss of power instead of right away to account for short interruptions to power that are not actual prolonged AC outages.

Power to a PSU can be briefly cut. For example, sometimes backup power (e.g., a generator or reserve power) is engaged, and the BBUs do not need to discharge to power the PSUs because the PSUs will be powered by the standby generators. For example, as described with respect to FIG. 1, each main switchboard may have a generator, which provides backup power in the event of an outage. Typically, backup power is engaged within around 30 seconds. As another example, there may be a brief (less than the timeout period) outage due to causes other than a utility AC outage. For example, maintenance activities that are not true utility AC outages involve AC power disturbances or outages. For example, a test may cut AC power to the racks for less than around 45 seconds. By the time the timeout period has elapsed, an imminent power loss is expected because the BBUs will only last a short while longer (e.g., 45 more seconds for a total of 90 seconds). Typically, if power is not provided to the PSU within the waiting period, then there is a true AC outage (e.g., a standby generator is not functioning).

In some embodiments, the power loss notification is secured to prevent forgery. For example, power loss notifications can be cryptographically signed by a rack switch with a signing key accessible only to the rack switch. A client library verifies the signature and ignores notifications that do not have a valid signature.

A server can respond to a power outage in a variety of ways. Each service can respond differently to the imminent power loss. An example of how a server can prepare for a power outage at the database level will now be described. In a typical MySQL arrangement, a master controls a number of slaves. If a power outage affects a master, the slaves will typically not know what to do. Thus, to prepare for an outage, a slave that will not be affected by the power outage can be promoted to be master. This is called a "live promotion." When the server receives a signal of an imminent outage, the server determines a slave that is outside the region of outage to promote to master, and promotes the slave to master. In a typical configuration, a redundant device such as a load balancer unit (LBU) stores data such as state information that is used when a slave is promoted to master.

One example of how a tier might respond to imminent power loss has been described. Other tiers can respond differently. For example, a halt command can be executed, which stops execution and gracefully shuts down operations while storing in process data to memory so that the power loss does not impact the service.

Interested services can find out if its rack is about to lose power in variety of ways. First, an application can listen for a siren alert directly. For example, an application of the service listens to a port for power loss siren alerts in the form of UDP packets. The power loss siren alert can be UTF-8 JSON encoded thrift objects. The object can be verified to determine that it is an authentic siren using a cryptographic signature of the rack switch. Second, an interested application can make calls using a provided library to watch for siren alerts. Third, a local daemon on a server rack can push siren alerts to subscribers. The local daemon is a siren proxy that can push JSON-encoded power loss sirens to standard HTTP2 streaming clients.

Figure 8:
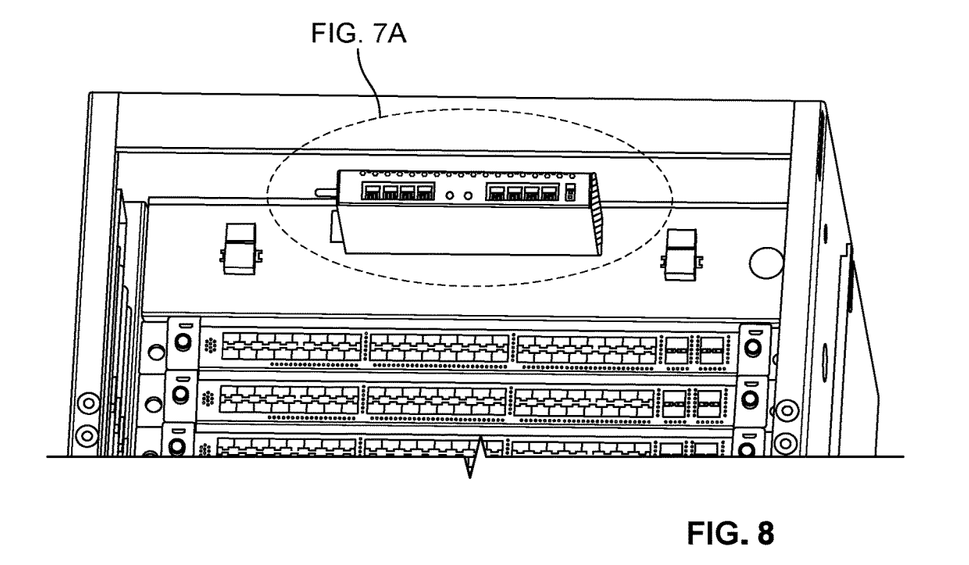
FIG. 8 shows an example of a physical rack monitor mounted on a server rack.

FIG. 7A is a front view of an example of a physical rack monitor. FIG. 7B is a perspective view of an example of a physical rack monitor. The physical rack monitor shown here includes a chassis with opening for GPIO connections, rack connections, and a connection to TOR. The physical rack monitor shown here corresponds to the block diagram shown in FIG. 5. FIG. 8 shows an example of a physical rack monitor mounted on a server rack. In this example, the rack monitor is mounted with a TOR computer network switch.

The power management system disclosed here improves the functioning of a computer network, specifically one or more server racks by detecting an AC outage and notifying servers of imminent power loss to enable the servers to prepare for the power loss and minimize service interruptions. In another aspect, in some embodiments, the power loss detection and notification is entirely performed by internal components of a server rack and does not rely on external services to notify regarding a power loss.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A power management system, comprising:
   a detection unit configured to detect a power interruption to a power supply; and
   a communication interface configured to, in response to the detected power interruption, provide a message regarding the detected power interruption, wherein the message is provided to a computer network switch after a waiting period, the waiting period being based on a length of time that a backup power unit provides power;
   wherein, in response to the detected power interruption, a computer network switch provides notifications to a plurality of servers connected to the switch to allow the plurality of servers to prepare for a loss in power.

2. The system of claim 1, wherein the waiting period is half the length of time that a backup power unit provides power.

3. The system of claim 1, wherein the message is a general-purpose input/output (GPIO) signal.

4. The system of claim 1, wherein the message includes an outage state, duration, and port of origin of the message.

5. The system of claim 1, wherein data of at least one of the servers is written to a persistent data storage device in response to receiving at least one of the notifications.

6. The system of claim 1, wherein the power management system is installed in a server rack.

7. The system of claim 1, further comprising a memory configured to store log data associated with the power interruption to the power supply.

8. The system of claim 1, wherein system is further configured to:
collect log data associated with the power interruption to the power supply; and
forward the log data to a remote database.

9. The system of claim 1, wherein the detection unit is configured to monitor a plurality of power supplies.

10. The system of claim 1, wherein the message includes a general-purpose input-output (GPIO) signal, the signal including a status indication and a specification of a time duration.

11. The system of claim 1, wherein the message identifies which power supply among a plurality of power supplies has lost power.

12. The system of claim 11, wherein the power supply that has lost power is a redundant power supply.

13. The system of claim 1, wherein the detection of the power interruption to the power supply is based on a duration encoded in a signal, the duration indicating at least one of: a beginning time of the power interruption and a countdown to when the backup power unit will stop providing power.

14. The system of claim 1, wherein the notifications provided by the computer network switch are authenticable by a cryptographic signature of the power management system from which the notifications originated.

15. The system of claim 1, wherein in response to at least one of the provided notifications, at least one of the plurality of servers prepare for the loss in power by initiating a promotion of a selected slave to a master and the selected slave is determined to be not subject to the power interruption.

16. The system of claim 1, wherein in response to at least one of the provided notifications, the message was provided to a baseboard management controller (BMC) included in the computer network switch.

17. The system of claim 1, wherein the notifications are provided to the plurality of servers at substantially the same time that an instruction is sent to the backup power unit to discharge.

18. The system of claim 1, wherein the notifications are provided to the plurality of servers after a threshold delay period after sending an instruction to the backup power unit to discharge.

19. A method comprising:
detecting a power interruption to a power supply; and
in response to the detected power interruption, providing a message regarding the detected power interruption, wherein the message is provided to a computer network switch after a waiting period, the waiting period being based on a length of time that a backup power unit provides power;
in response to the detected power interruption, providing notifications to a plurality of servers connected to the switch to allow the plurality of servers to prepare for a loss in power.

20. A computer program product embodied in a non-transitory computer readable storage medium and comprising computer instructions for:
detecting a power interruption to a power supply; and
in response to the detected power interruption, providing a message regarding the detected power interruption, wherein the message is provided to a computer network switch after a waiting period, the waiting period being based on a length of time that a backup power unit provides power;
in response to the detected power interruption, providing notifications to a plurality of servers connected to the switch to allow the plurality of servers to prepare for a loss in power.

* * * * *